US007068330B2

(12) United States Patent
Song et al.

(10) Patent No.: US 7,068,330 B2
(45) Date of Patent: Jun. 27, 2006

(54) LIQUID CRYSTAL DISPLAY USING SWING STORAGE ELECTRODE AND A METHOD FOR DRIVING THE SAME

(75) Inventors: Jang-Kun Song, Seoul (KR); Joon-Hoo Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 313 days.

(21) Appl. No.: 09/887,117

(22) Filed: Jun. 25, 2001

(65) Prior Publication Data

US 2002/0018035 A1 Feb. 14, 2002

(30) Foreign Application Priority Data

Jul. 27, 2000 (KR) .............................. 2000-43511

(51) Int. Cl.
*G02F 1/1343* (2006.01)

(52) U.S. Cl. .......................... 349/39; 349/139; 345/87

(58) Field of Classification Search .................. 345/87, 345/100; 349/38, 139

See application file for complete search history.

(56) References Cited

U.S. PATENT DOCUMENTS

| | | | | |
|---|---|---|---|---|
| 5,748,165 | A * | 5/1998 | Kubota et al. | 345/96 |
| 5,926,161 | A * | 7/1999 | Furuhashi et al. | 345/100 |
| 6,064,358 | A * | 5/2000 | Kitajima et al. | 345/88 |
| 6,421,039 | B1 * | 7/2002 | Moon et al. | 345/100 |
| 6,489,952 | B1 * | 12/2002 | Tanaka et al. | 345/205 |

* cited by examiner

*Primary Examiner*—Kent Chang

(57) ABSTRACT

A liquid crystal display includes swing common electrodes for storage capacitors to sequentially apply signal voltages based on display data to target pixels to display picture images at respective frames. The voltage applied to the common electrodes is terminated with minus (−) during the period of gate on in case the pixel voltage is inverted from minus (−) to plus (+) while being terminated with plus (+) in case the pixel voltage is inverted from plus (+) to minus (−). The common voltage is repeatedly swung from minus (−) to plus (+) after the gate turns off. In these conditions, the respective common electrode lines for the storage capacitors are periodically swung synchronized with gate pulses to thereby generate overshoot. The response speed of the liquid crystal is enhanced due to the overshoot when the gray scale is altered due to the memory effect of the liquid crystal capacitor.

11 Claims, 12 Drawing Sheets

Fig. 1
Prior art

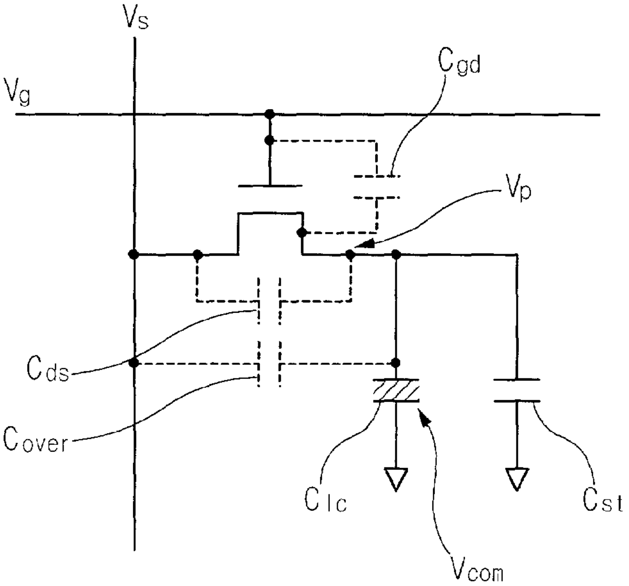

Fig. 2
Prior art

| | (+)→(-) Inversion | (-)→(+) Inversion |
|---|---|---|
| Form of Pulse signal application to storage COM | 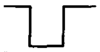 | 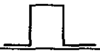 |
| □Dielectric constnat<br>- High → Low<br>□Voltage<br>- High → Low<br>□Gray<br>- High → Low | 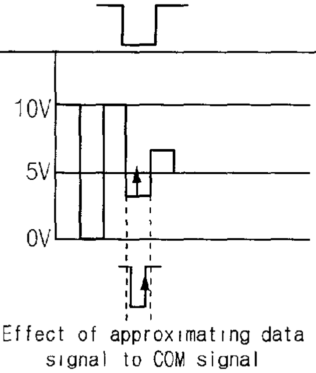<br>Effect of approximating data signal to COM signal | 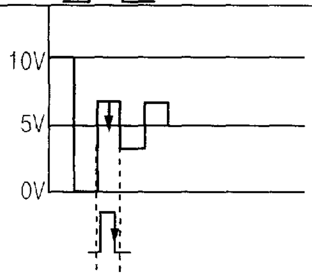<br>Effect of approximating data signal to COM signal |
| □Dielectric constnat<br>- Low → High<br>□Dielectric constnat<br>- Low → High<br>□Dielectric constnat<br>- High → Low | 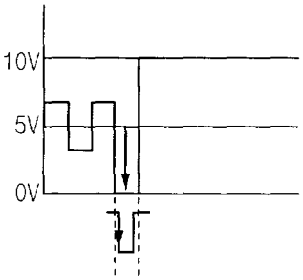<br>Overshoot of data voltage | 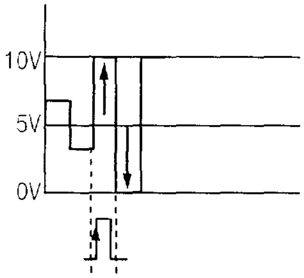<br>Overshoot of data voltage |

LIQUID CRYSTAL DISPLAY USING SWING STORAGE ELECTRODE AND A METHOD FOR DRIVING THE SAME

BACKGROUND OF THE INVENTION (a) Field of the Invention

The present invention relates to a liquid crystal display and a method for driving the same and, more particularly, to liquid crystal display achieving a quick response speed based on the overshoot generated through swinging storage electrode voltages in tune with gate pulses.

(b) Description of the Related Art

Pursuant to the requirements by the consumers for thin and lightweight display devices, a liquid crystal display as a flat panel display has been currently used in a most extensive manner in lieu of cathode ray tubes (CRTs). Such a liquid crystal display basically has two glass substrates with electrodes for generating electric fields, and a liquid crystal layer sandwiched between the substrates. When voltages are applied to the electrodes, the liquid crystal molecules are rearranged to control light transmission.

One of the substrates is provided with an array of thin film transistors (TFTs) for switching voltages applied to the electrodes, and the other is provided with a common electrode and color filters. The former is usually called the "TFT array substrate", and the latter called the "color filter substrate."

FIG. 1 illustrates a pixel equivalent circuit of a typical TFT LCD. In the TFT LCD, each pixel includes a TFT switching circuit where a source terminal and a gate terminal are connected to a data line and a gate line, a liquid crystal capacitor $C_{ic}$ and a storage capacitor $C_{st}$ each connected to a drain terminal of the TFT switching circuit, a first parasitic capacitor $C_{gd}$ formed between the gate terminal and the drain terminal, a second parasitic capacitor $C_{ds}$ formed between the drain terminal and the source terminal, and an overlap capacitor $C_{over}$ formed between the data line and a pixel electrode.

The way of driving the liquid crystal disposed between the pixel electrodes $V_p$ of the TFT array substrate and the common electrode $V_{com}$ of the color filter substrate will be briefly explained.

When the TFT switching circuit receives a positive pulse through the gate line, it becomes to be in a state of turn on. At this time, a signal voltage is applied to the source electrode of the TFT switching circuit through the signal line, and transmitted to the liquid crystal capacitor $C_{ic}$ and the storage capacitor $C_{st}$ through the drain. The signal voltage is applied to the liquid crystal capacitor $C_{ic}$ even after the gate voltage turns off. However, a pixel voltage shifts its voltage level shift to a certain degree because of the first parasitic capacitance $C_{gd}$ formed between the gate and the drain.

When it is intended to use the above-structured LCD in a large display, the response speed. In order to enhance the response speed, Matsushita company of Japan proposes to improve the currently used capacitive coupled driving (CCD) technique.

FIG. 2 illustrates the effects of a usual CCD technique. As shown in FIG. 2, the direction of making overshoot and undershoot with respect to the pixel is determined depending upon the property of the liquid crystal. When a pulse is applied to the common electrode COM, the amount of capacitive coupling is turned out to be greater in the direction of the pulse at the liquid crystal with a lower dielectric constant. The pulse of voltage down and voltage up is applied to the common electrode COM in the case of being inverted from plus (+) to minus (−), and the pulse of voltage up and voltage down is applied thereto in the case of being inverted from minus (−) to plus (+). In the normally white mode, when a high gray level becomes to be a low gray level, or a low gray level becomes to be a high gray level, undershoot or overshoot that is lower or higher than the desired normal state of voltage occurs at the liquid crystal so that the liquid crystal molecules are rotated more rapidly.

FIG. 3 illustrates a pixel equivalent circuit of the TFT LCD using previous gates proposed by Matsushita company, and FIG. 4 illustrates the response speed characteristic of the TFT LCD shown in FIG. 3.

In the pixel equivalent circuit, one end of the storage capacitor $C_{st}$ is connected to the drain, and the other end is connected to a previous gate.

In operation, the average voltage Vp applied to the pixel under the application of is a gate pulse is calculated using the following equation 1:

$$V_p=\pm V_s+(C_{st}/(C_{st}+C_{gd}+C_{ic}))\cdot\Delta V_g \qquad (1)$$

where $V_s$ indicates the voltage applied to the source terminal, $C_{st}$ indicates the capacitance of the storage capacitor, $C_{gd}$ is the parasitic capacitance between the gate terminal and the drain terminal, $C_{ic}$ is the capacitance of the liquid crystal capacitor, and $\Delta V_g$ is the difference between the previous gate voltage and the present gate voltage.

However, the technique of using previous gates increases the gate load. Furthermore, the technique can be employed only for the line inversion driving method and the cross talk or flickermakes it difficult to be used for high resolution wide screen LCDs.

Furthermore, the currently available gate tap IC cannot be used with such a technique. When the gate voltage is over-heightened at the off state, the off current ($I_{off}$) increases, making it difficult to change the gate value.

As described above, the use of previous gate signals as well as the two stepped gate signal application serves to enhance the response speed, but may not be applied to high resolution wide screen LCDs.

SUMMARY OF THE INVENTION

It is an object of the present invention to provide an LCD that uses swing storage electrodes to enhance the response speed.

It is another object of the present invention to provide an LCD that uses swing storage electrodes in the line inversion driving method to enhance the response speed.

It is still another object of the present invention to provide an LCD that uses swing storage electrodes in the dot inversion driving method to enhance the response speed.

It is still another object of the present invention to provide a method for driving an LCD that uses swing storage electrodes to enhance the response speed.

These and other objects may be achieved by a liquid crystal display bearing the following features.

According to one aspect of the present invention, the liquid crystal display sequentially applies signal voltages based on display data to target pixels to display picture images at respective frames. When pixels using swing storage electrodes for storage capacitors are driven, voltages applied to the storage electrodes are terminated with minus (−) during the period of gate on in case the pixel voltages are inverted from minus (−) to plus (+). In contrast, in case the pixel voltage is inverted from plus (+) to minus (−), the voltages applied to the storage electrodes are terminated with plus (+). After the gates turn off, the voltages applied to the storage electrodes are repeatedly swung from minus (−) to plus (+).

According to another aspect of the present invention, the liquid crystal display includes a timing signal control unit outputting data driver driving signals and gate driver driving signals. The timing signal control unit also outputs first signals for defining the cycle and amplitude of storage voltages depending upon vertical synchronization signals, horizontal synchronization signals, and main clock signals applied from the outside.

A data driver outputs data driving voltages for driving polarities of a liquid crystal capacitor on the basis of the data driver driving signals.

A gate driver outputs gate driving voltages on the basis of the gate driver driving signals.

A driving voltage generation unit makes the voltage level of the first signals to go up or down upon receipt of the first signals, and outputs swing storage voltages in tune with the gate driving voltages at a predetermined cycle.

A liquid crystal display panel has one or more gate lines carrying scanning signals, one or more data lines crossing over the gate lines to carry picture signals, switching elements surrounded by the gate and data lines while being connected thereto, a liquid crystal capacitor transmitting light in proportion to the data driving voltages depending upon the turn on operations of the switching elements, and storage capacitors storing the data driving voltage at the turn on of the switching element and applying the stored data driving voltage to the liquid crystal capacitor at the turn off of the switching element.

The liquid crystal display panel is driven through line inversion such that the line at the present frame has a polarity inverted from the polarity of the line at the previous frame.

Alternatively, the liquid crystal display panel may be driven through dot inversion such that the dot at the present frame has a polarity inverted from the polarity of the dot at the previous frame.

In a method for driving the liquid crystal display, variations in pixel voltages depending upon gate on and off operations of the switching circuits are first checked. When it is checked at the (a) step that the pixel voltage is inverted from minus (−) to plus (+), a storage voltage is output such that it is terminated with minus (−) during the period of gate on, and repeatedly swung from minus (−) to plus (+) during the period of gate off. In contrast, when it is checked at the (a) step that the pixel voltage is inverted from minus (−) to plus (+), a storage voltage is output such that it is terminated with plus (+) during the period of gate on, and repeatedly swung from plus (+) to minus (−) during the period of gate off.

Consequently, the respective storage electrode lines for the storage capacitors are periodically swung in tune with gate pulses to thereby generate overshoot. The response speed is enhanced due to the overshoot when the gray scale is altered due to the memory effect of the liquid crystal capacitor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein:

FIG. 1 is a circuit diagram of a typical TFT LCD;

FIG. 2 illustrates the performance characteristics of the TFT LCD shown in FIG. 1 under the application of a conventional CCD technique;

DETAILED DESCRIPTION OF THE PREFERRED EMBODIMENTS

Preferred embodiments of this invention will be explained with reference to the accompanying drawings.

Figure 3:
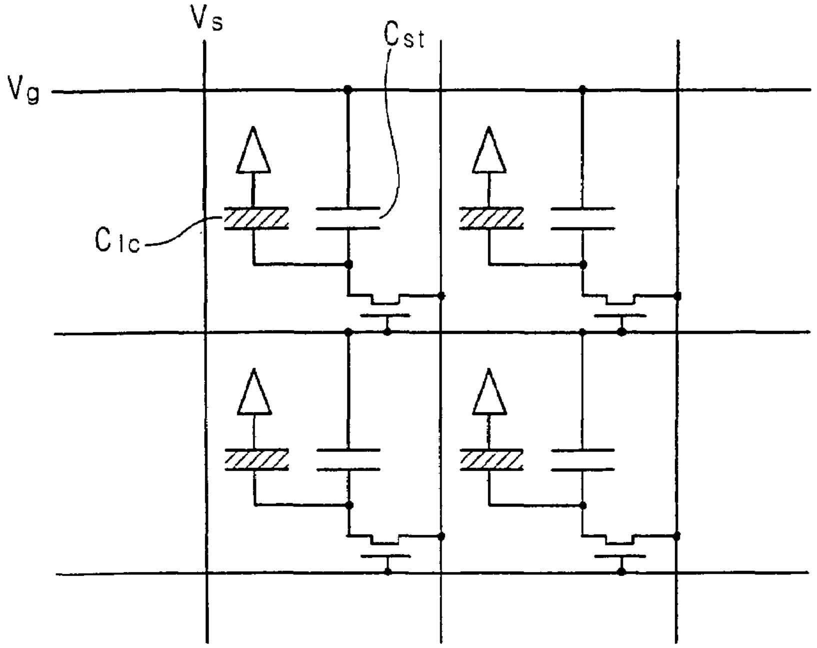
Fig. 3 Prior art
FIG. 3 is a circuit diagram of a TFT LCD with the use of previous gate signals as proposed by Matsushita company.
Figure 4:
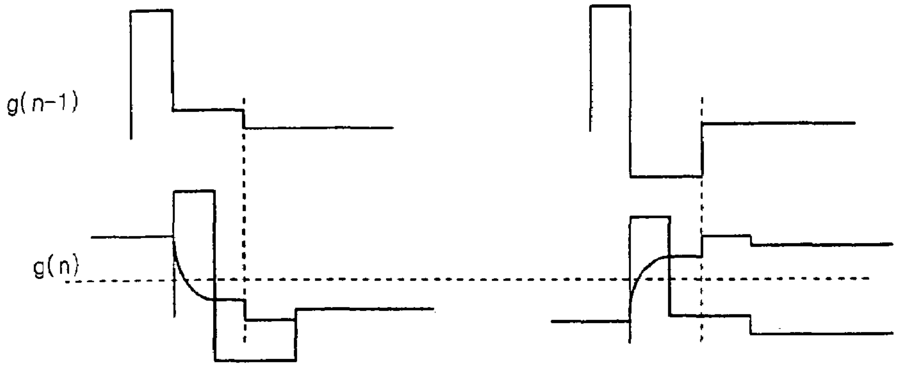
Fig. 4 Prior art
FIG. 4 is a waveform chart illustrating the response speed characteristic of the TFT LCD shown in FIG. 3.
Figure 5:
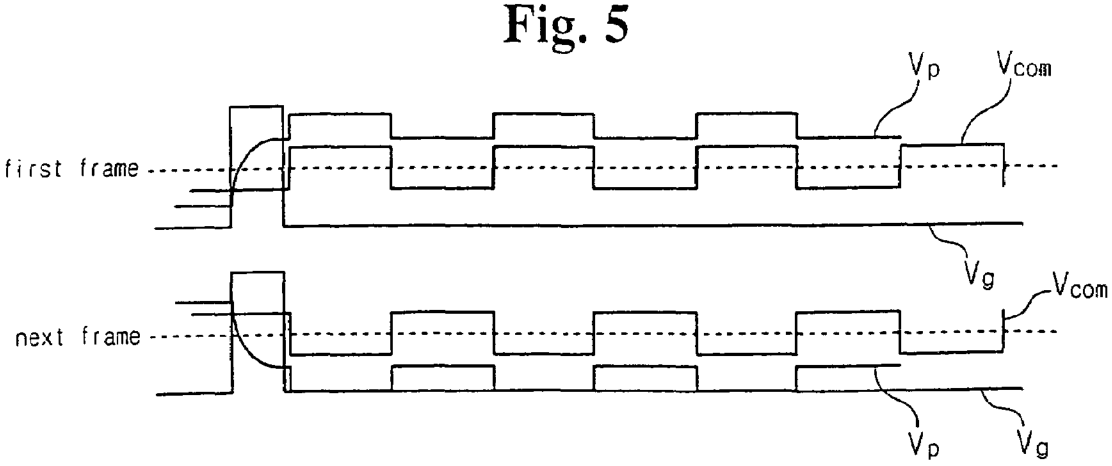
FIG. 5 is a waveform chart illustrating variations in pixel voltages due to periodical swing storage voltages according to the present invention.

FIG. 5 is a waveform chart illustrating variations in pixel voltages due to periodical swing storage voltages according to the present invention.

As shown in FIG. 5, the voltages applied to a pixel are swung through swinging the storage voltages. The average pixel voltage Vp can be given by the following equation 2:

$$V_p=\pm V_s+(C_{st}/2(C_{st}+C_{gd}+C_{ic}))\cdot\Delta V_{com} \quad (2)$$

where $V_s$ indicates the voltage applied to the source terminal, $C_{st}$ indicates the capacitance of the storage capacitor, $C_{gd}$ is the parasitic capacitance between the gate terminal and the drain terminal, $C_{ic}$ is the capacitance of the liquid crystal capacitor, and $V_{com}$ is the difference between the previous storage voltage $V_{st}$ and the present storage voltage $V_{st}$.

The voltage additionally applied to the storage electrode is proportional to the value of $C_{st}/(C_{st}+C_{ic})$. Therefore, when the gray scale is altered due to the memory effect of the liquid crystal capacitor $C_{ic}$, it generates overshoot to enhance the response speed of the liquid crystal.

For such a purpose, the following conditions should be all satisfied: (a) when the pixel voltage is inverted from minus (−) to plus (+), the storage voltage is terminated with minus (−) during the period of gate on; (b) when the pixel voltage is inverted from plus (+) to minus (−), the storage voltage is terminated with plus (+) during the period of gate on; and (c) when the gate is in an off state, minus (−) and plus (+) are repeatedly swung.

Various techniques of driving an LCD satisfying all of the above conditions will be now described in detail.

Figure 6:
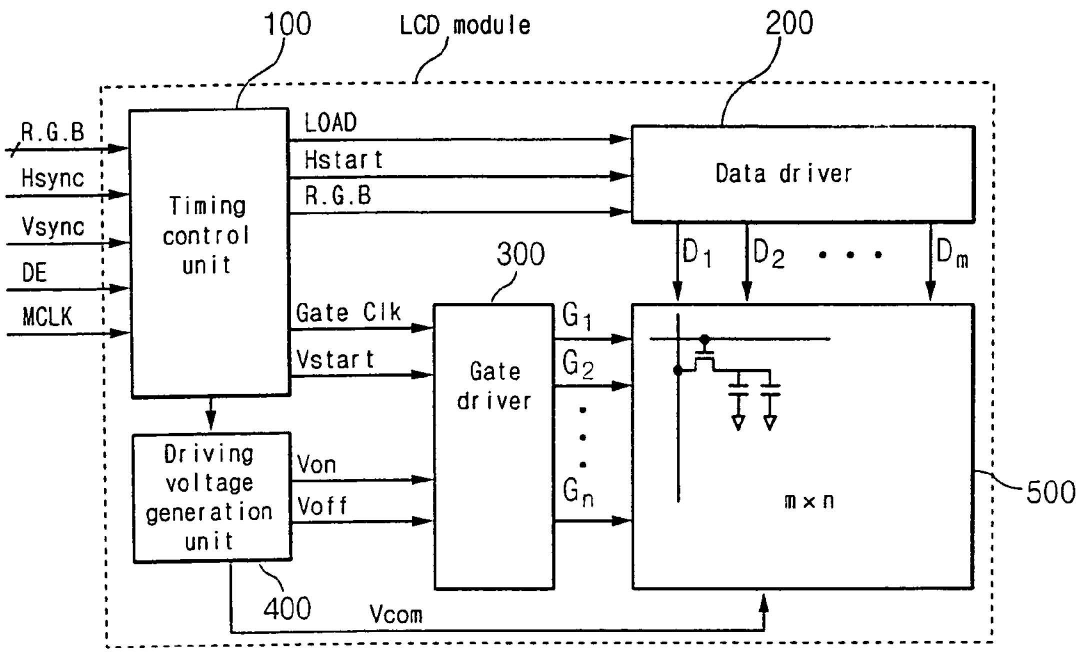
FIG. 6 is a block diagram of an LCD using swing storage electrodes according to a preferred embodiment of the present invention.

FIG. 6 is a block diagram of an LCD using swing storage electrodes according to a preferred embodiment of the present invention.

As shown in FIG. 6, the LCD includes a timing control unit 100, a data driver 200, a gate driver 300, a driving voltage generation unit 400, and an LCD panel 500.

The timing control unit 100 outputs data driver driving signals (LOAD, Hstart, R, G, and B), and gate driver driving signals (Gate Clk, and $V_{start}$). The timing control unit 100 also outputs first signals to the driving voltage generation unit 400 to define the cycle and amplitude of the storage voltage $V_{st}$ depending upon vertical synchronization signals $V_{sync}$, horizontal synchronization signals Hsync, and main clock signals MCLK applied from the outside.

The data driver 200 outputs data driving voltages (D1, D2, . . . , Dm) to data lines of the LCD panel 500 to drive polarities of the liquid crystal capacitor $C_{ic}$ on the basis of the data driver driving signals (LOAD, Hstart, R, G, and B).

The gate driver 300 outputs gate driving voltages (G1, G2, . . . , Gn) to gate lines of the LCD panel 500 on the basis of the gate driver driving signals (Gate Clk, and Vstart) received from the timing control unit 100, and the signals of Von and Voff received from the driving voltage generation unit 400.

The driving voltage generation unit 400 makes the voltage level of the first signals to go up or down upon receipt of the first signals defining the cycle and amplitude of the storage voltage, and outputs swing storage voltages $V_{st}$ in synchronization with the gate driving voltages at a predetermined cycle.

The LCD panel 500 includes one or more gate lines carrying scanning signals, one or more data lines carrying picture signals, switching elements TFTs surrounded by the gate lines and the data lines and connected thereto, a liquid crystal capacitor $C_{ic}$ transmitting the light received from a backlight in proportion to the data driving voltages depending upon the state of the switching elements, and storage capacitors $C_{st}$ storing the data driving voltage the switching element is turned on, and applying the stored data driving voltage to the liquid crystal capacitor $C_{ic}$ when the switching element is turned off.

In short, the storage voltages output from the driving voltage generation unit 400 are applied to storage electrode lines horizontally or vertically arranged at the LCD panel 500 while generating overshoot, which enhances the response speed of the liquid crystal.

Figure 7:
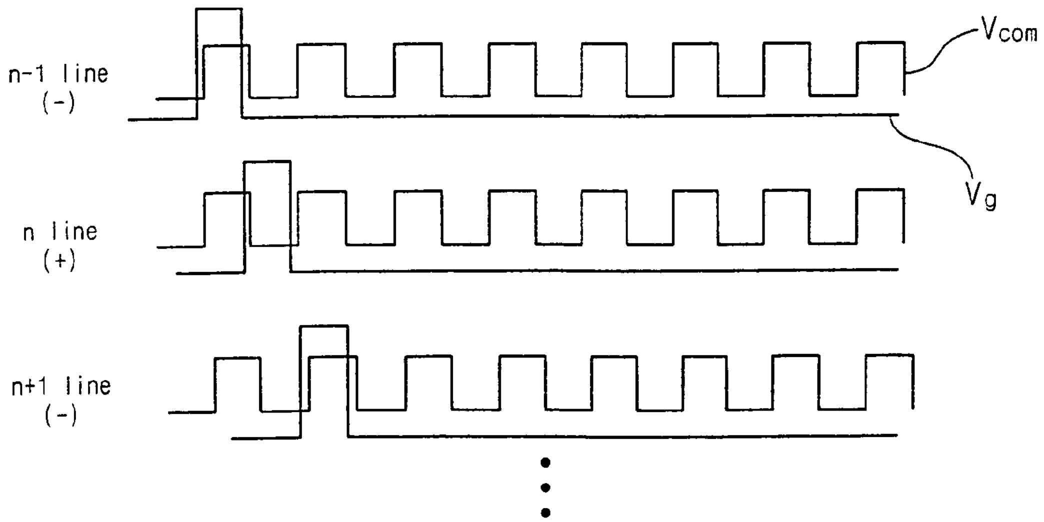
FIG. 7 is a waveform chart illustrating the application of a single type of storage electrodes for the line inversion driving in the LCD shown in FIG. 6.

FIG. 7 is a waveform chart illustrating variations in storage voltages $V_{st}$ when a single type of storage electrodes is used for the line inversion driving.

As shown in FIG. 7, when the odd-numbered (n−1)th or (n+1)th line is driven under the application of a gate pulse, first storage voltages are output with the same width as that of the gate pulse. In contrast, when the even-numbered nth line is driven under the application of a gate pulse, second storage voltages are output with the same width as that of the gate pulse.

That is, the storage voltage is terminated with minus (−) at the nth line where minus (−) is inverted into plus (+), and this satisfies the condition (a). In contrast, the storage voltage is terminated with plus (+) at the (n−1)th or (n+1)th line where plus (+) is inverted into minus (−), and this satisfies the condition (b). The storage voltages are periodically swung at the state of gate off, and this satisfies the condition (c).

Since the voltages at the respective lines are outlined in the same shape, the voltages required for generating overshoot can be applied only with one kind of storage electrodes.

In short, when the line inversion driving is initiated under the application of a gate pulse, a single type of storage voltages that have the same width as that of the gate pulse with a inverted polarity can be used for the driving. In this way, the response speed of the liquid crystal can be enhanced while satisfying all of the three conditions (a), (b) and (c) in a simultaneous manner.

Figure 8:
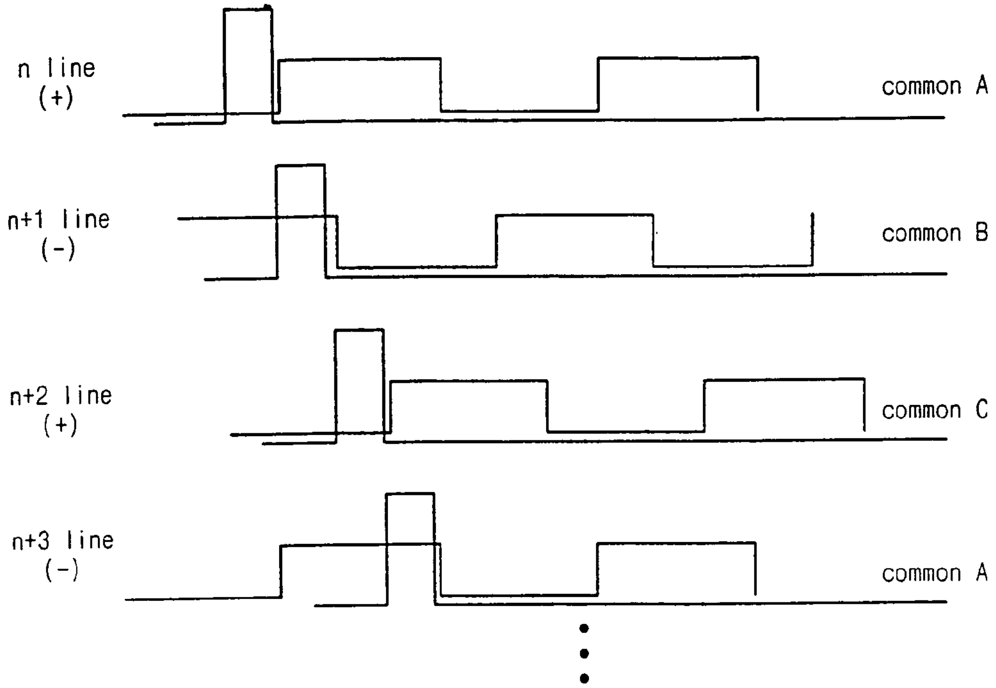
FIG. 8 is a waveform diagram illustrating the application of multiple types of storage electrodes for the line inversion driving in the LCD shown in FIG. 6.

FIG. 8 is a waveform chart illustrating variations in storage voltages $V_{st}$ with the use of three types of storage electrodes for the line inversion driving.

As shown in FIG. 8, when the (n)th line is driven by a gate pulse, storage voltages of a first type having a pulse width three times than that of the gate pulse are output. When the (n+1)th line is driven by a gate pulse, storage voltages of a second polarity having a pulse width three times longer than that of the gate pulse are output. When the (n+2)th line is driven by a gate pulse, storage voltages of a third type having a pulse width three times longer than that of the gate pulse are output.

The storage voltage is terminated with minus (−) at the (n)th or (n+2)th line where the pixel voltage is inverted from minus (−) into plus (+), and this satisfies the condition (a). In contrast, during the gate on period, the storage voltage is terminated with plus (+) at the (n+1)th or (n+3)th line where plus (+) the pixel voltage is inverted from minus (−), and this satisfies the condition (b). The storage voltages are periodically swung at the gate off state, and this satisfies the condition (c).

In short, three types of storage electrodes A, B and C are used to enhance the response speed of the liquid crystal in the line inversion driving. In the storage electrodes A, the same voltage is applied to the group of (n)th, (n+3)th, (n+6)th, and (n+9)th lines. Likewise in the electrodes B, the same voltage is applied to the group of (n+1)th, (n+4)th, and (n+7)th lines. In the storage electrodes C, the same storage voltage is applied to the group of (n+2)th, (n+5)th, and (n+8)th lines.

In this way, various types (four, five, six, etc.) of storage electrodes can be used to drive the LCD panel based on the line inversion driving. The advantage of such a technique is that the frequency for swinging the storage electrode can be lowered. For instance, it solves the problem of the increased power consumption occurring when the voltages are applied to the storage electrode more frequently.

A technique of enhancing the response speed of the liquid crystal in a dot inversion driving method will be now described in detail.

In order to apply the swinging storage electrodes for the storage capacitors to the dot inversion driving, several aspects has to be considered.

Figure 9:
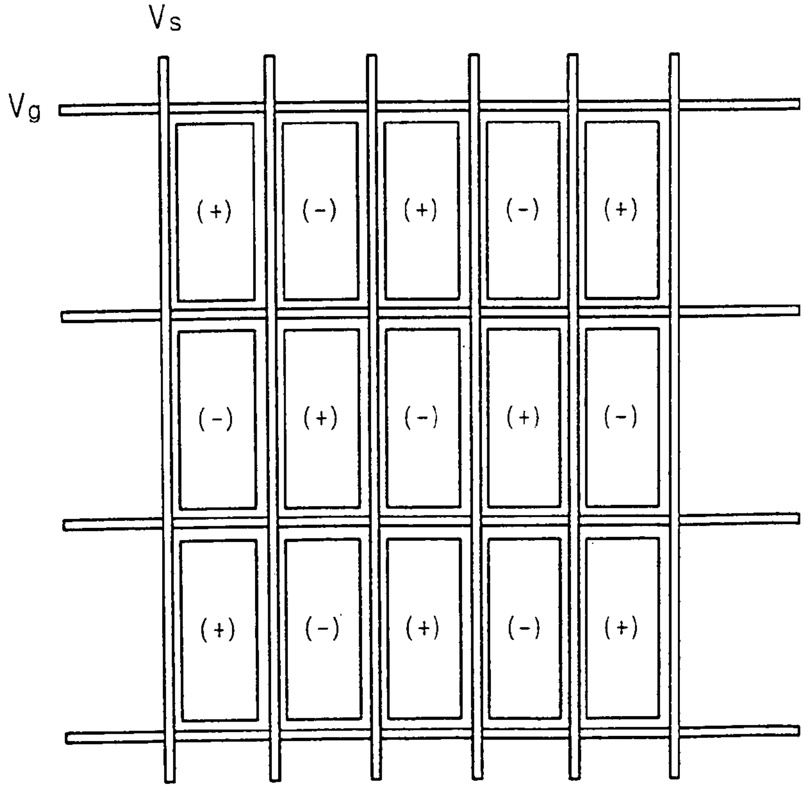
Fig. 9 Prior art
FIG. 9 illustrates a pixel arrangement for the dot inversion driving in an LCD according to a prior art.

FIG. 9 illustrates a pixel arrangement for the dot inversion driving in a conventional LCD.

In the dot inversion driving with the conventional LCDs, plus (+) and minus (−) polarities are co-existent at one line simultaneously. Therefore, when the gate opens, at least two types of storage electrodes should be present at one line. However, as shown in FIG. 9, in the pixel arrangement for the conventional dot inversion driving, a single type of storage electrodes cannot generate the desired overshoot.

Figure 10:
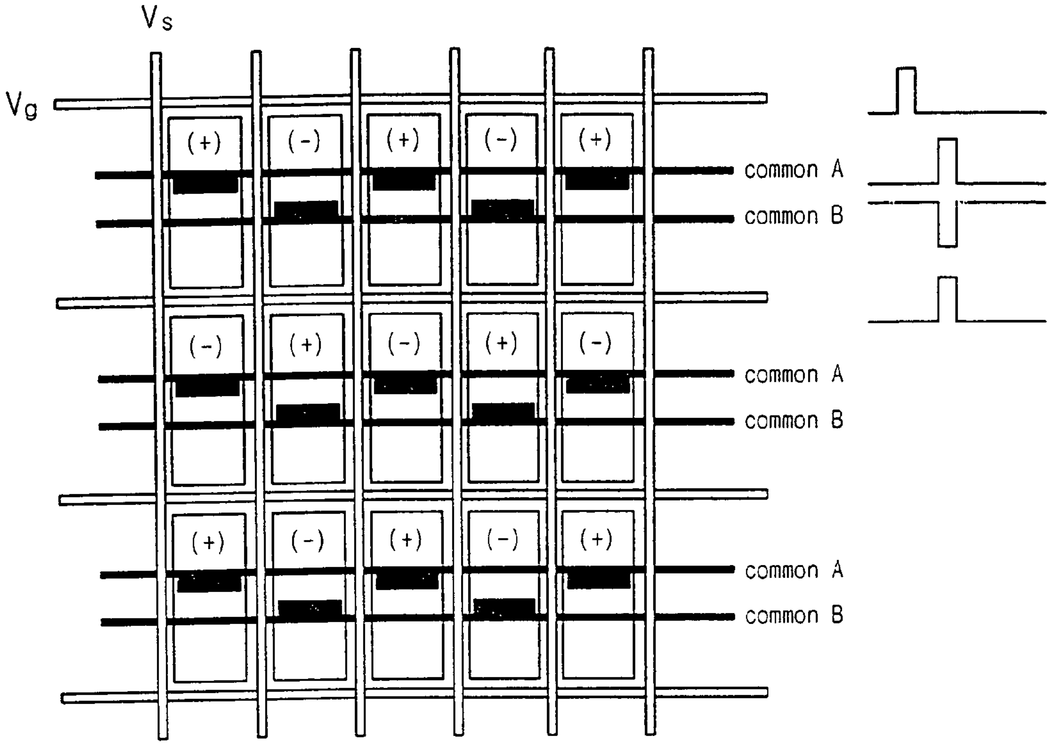
FIG. 10 illustrates a double-lined storage electrode structure for the dot inversion driving in the LCD shown in FIG. 6.
Figure 11:
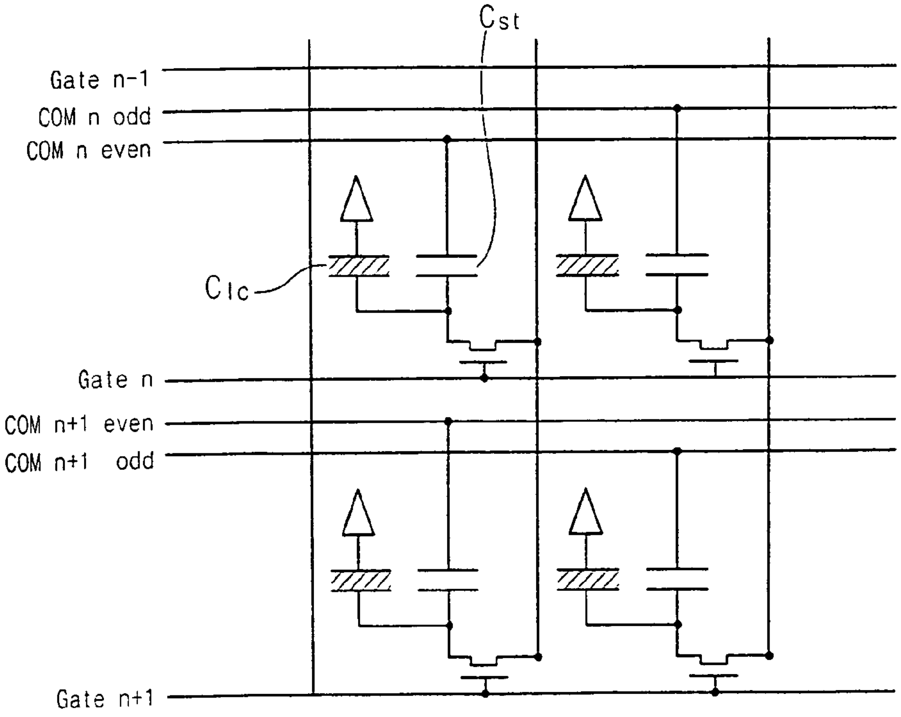
FIG. 11 is a circuit diagram illustrating a pixel equivalent circuit of the LCD shown in FIG. 10.

FIG. 10 illustrates a double-structured storage electrode lines for the dot inversion driving in the LCD shown in FIG. 6. FIG. 11 illustrates a pixel equivalent circuit of the LCD shown in FIG. 10.

As shown in FIG. 10, first and second storage electrode lines A and B are arranged between the neighboring gate lines in the horizontal direction. The first storage electrode line A is connected to odd-numbered (or even-numbered) pixel electrodes, and the second storage electrode line B is connected to even-numbered (or odd-numbered) pixel electrodes.

In the above structure, the pixels connected to the same data line Vs are connected to the same storage electrode line while being arranged in the vertical direction.

Figure 12:
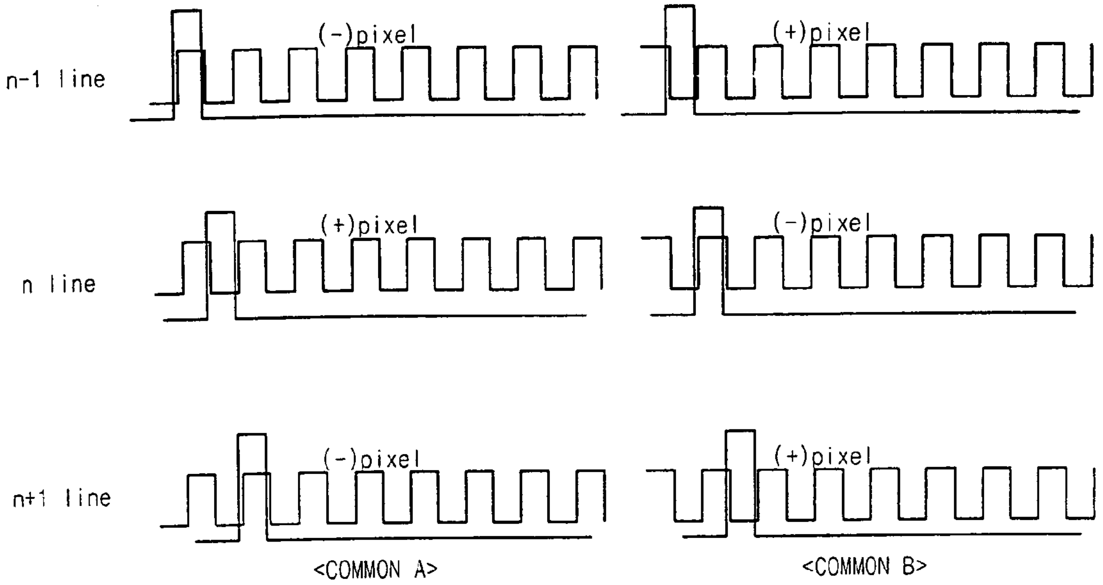
FIG. 12 is a waveform chart illustrating waveforms of storage voltages applied to the double-structured storage electrode lines shown in FIG. 10.

FIG. 12 is a waveform chart illustrating variations in the storage voltages $V_{st}$ applied to the double-structured storage electrode lines shown in FIG. 10.

As shown in FIG. 12, when the odd-numbered line (or the even-numbered line) is driven by a gate pulse, a first storage voltage is output to the first storage electrode line. In contrast, when the even-numbered line (or the odd-numbered line) is driven by a gate pulse, a second storage voltage inverted in polarity with respect to the first storage voltage is output to the first storage electrode line with the same width as that of the gate pulse.

Furthermore, when the odd-numbered line (or the even-numbered line) is driven by a gate pulse, the second storage voltage inverted in polarity with respect to the first storage voltage is output to the second storage electrode line with the same width as that of the gate pulse. In contrast, when the even-numbered line (or the odd-numbered line) is driven under the application of a gate pulse, the first storage voltage is output to the second storage electrode line with the same width as that of the gate pulse.

That is, the technique of driving each of the storage voltages A or B is the same as that of driving the single type of storage voltages for the line inversion driving described with reference to FIG. 6.

Figure 13:
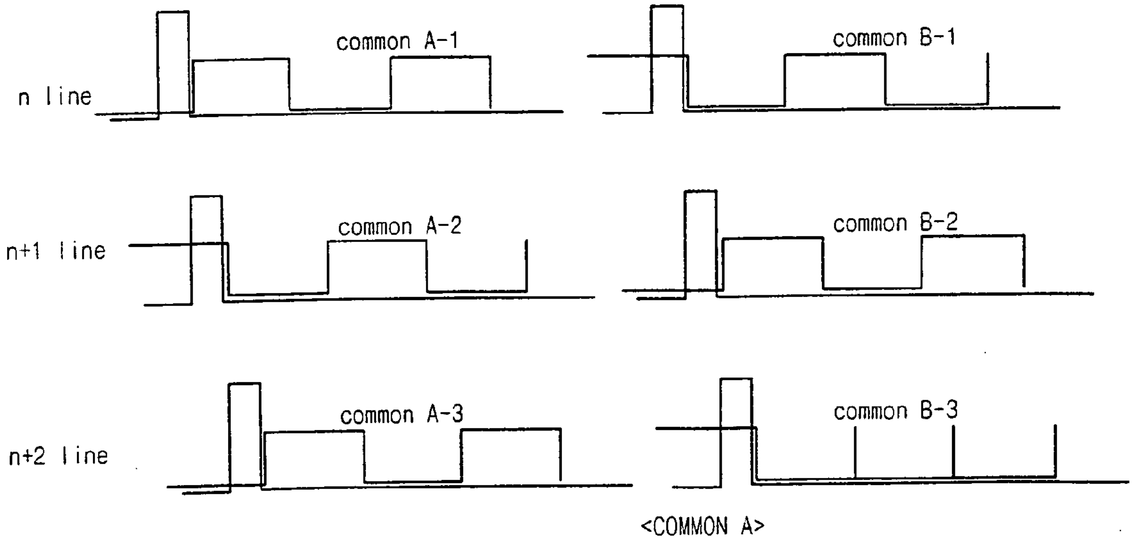
FIG. 13 is a waveform chart further illustrating waveforms of storage voltages applied to the double-structured storage electrode lines shown in FIG. 10.

FIG. 13 is a waveform chart illustrating the waveforms of storage voltages applied to the double-structured storage electrode lines shown in FIG. 10.

As shown in FIG. 13, the first storage voltages A are divided into three types of storage voltages A-1, A-2 and A-3, and the second storage voltages B are also divided into three types of storage voltages B-1, B-2 and B-3. Whenever the frames are changed, the first and second storage voltages A and B are alternated.

It is also possible that the storage voltages are further divided into a plurality of numbers (eight, ten, etc.) of storage voltages to lower the frequency of voltage waveforms applied to the storage electrodes.

Figure 14:
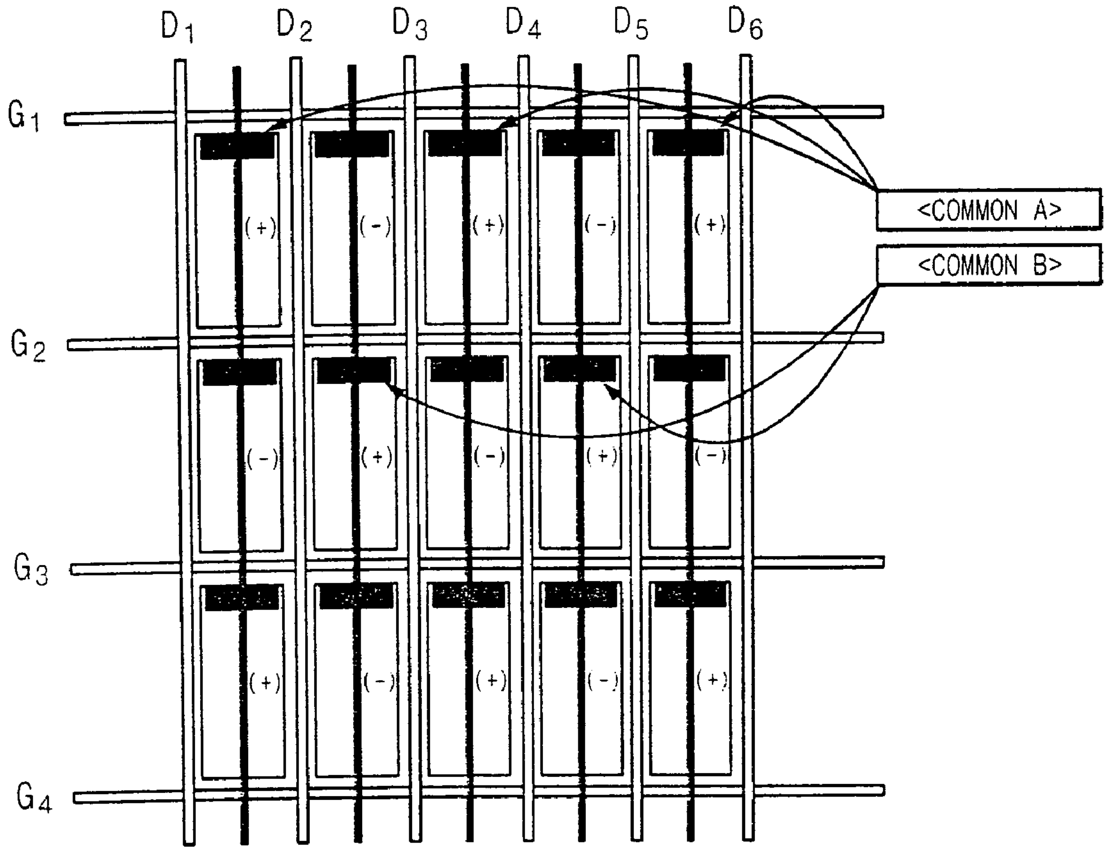
FIG. 14 illustrates an arrangement of storage electrodes at the source/drain regions of the LCD shown in FIG. 6.

FIG. 14 illustrates storage electrodes formed at source/drain (S/D) regions of the LCD shown in FIG. 6.

As shown in FIG. 14, first and second storage electrode lines are provided between the data lines proceeding in the vertical direction. The first storage electrode lines are arranged at the odd-numbered vertical columns, and the second storage electrode lines are arranged at the even-numbered horizontal columns.

First and second storage capacitors A and B are formed on the first and second storage electrode lines at the crossed area of the gate and data lines with a predetermined volume. The volume of the first and second storage capacitors A and B is so large as to compensate for the leakage of current due to the liquid crystal capacitor when the gate pulse is in an off state.

The technique of driving the storage voltage signals is the same as that described with reference to FIG. 12 or 13.

Figure 15:
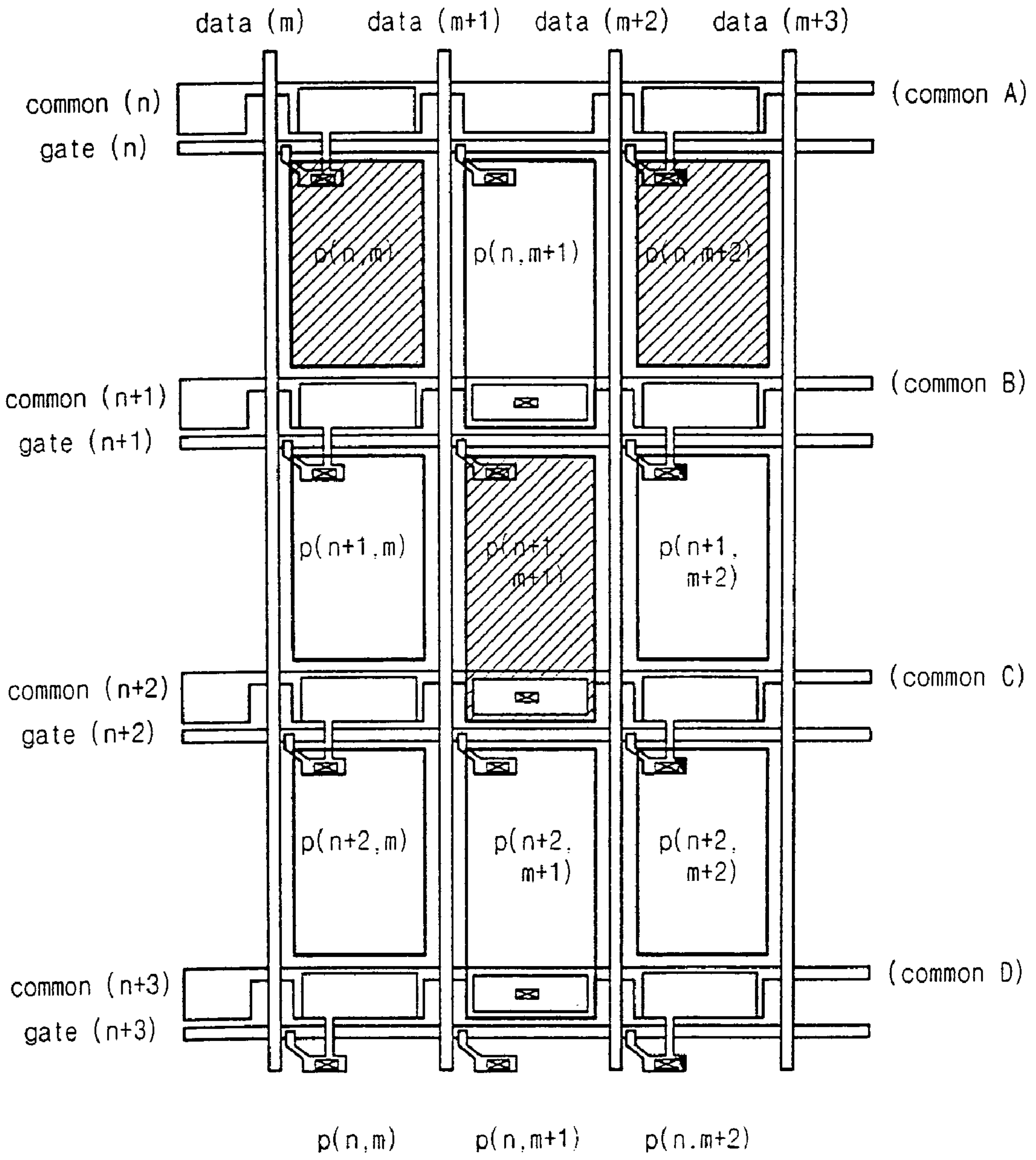
FIG. 15 illustrates an arrangement of a signal type of storage electrodes for the dot inversion driving in the LCD shown in FIG. 6.

FIG. 15 illustrates the structure of a single type of storage electrode lines for the dot inversion driving in the LCD shown in FIG. 6.

As shown in FIG. 15, odd-numbered and even-numbered storage electrode lines are arranged in the horizontal direction. Odd-numbered gate lines are arranged in the horizontal direction such that they are positioned close to the odd-numbered storage electrode lines.

Furthermore, even-numbered gate lines are arranged in the horizontal direction such that they are positioned close to the even-numbered storage electrode lines. Odd-numbered and even-numbered data lines are arranged in the vertical direction.

First storage capacitors are formed at the regions partitioned by the odd-numbered data lines and the even-numbered data lines while interconnecting the odd-numbered storage electrode lines and the odd numbered gate lines close thereto.

Furthermore, the first storage capacitors are also formed at the regions partitioned by the odd-numbered data lines and the even-numbered data lines while interconnecting the even-numbered storage electrode lines and the even-numbered gate lines close thereto.

Second storage capacitors are formed at the regions partitioned by the even-numbered data lines and the odd-numbered data lines while interconnecting the even-numbered storage electrode lines and the odd numbered gate lines.

Furthermore, the second storage capacitors are also formed at the regions partitioned by the even-numbered data lines and the odd-numbered data lines while interconnecting the odd-numbered storage electrode lines and the even-numbered gate lines.

Figure 16:
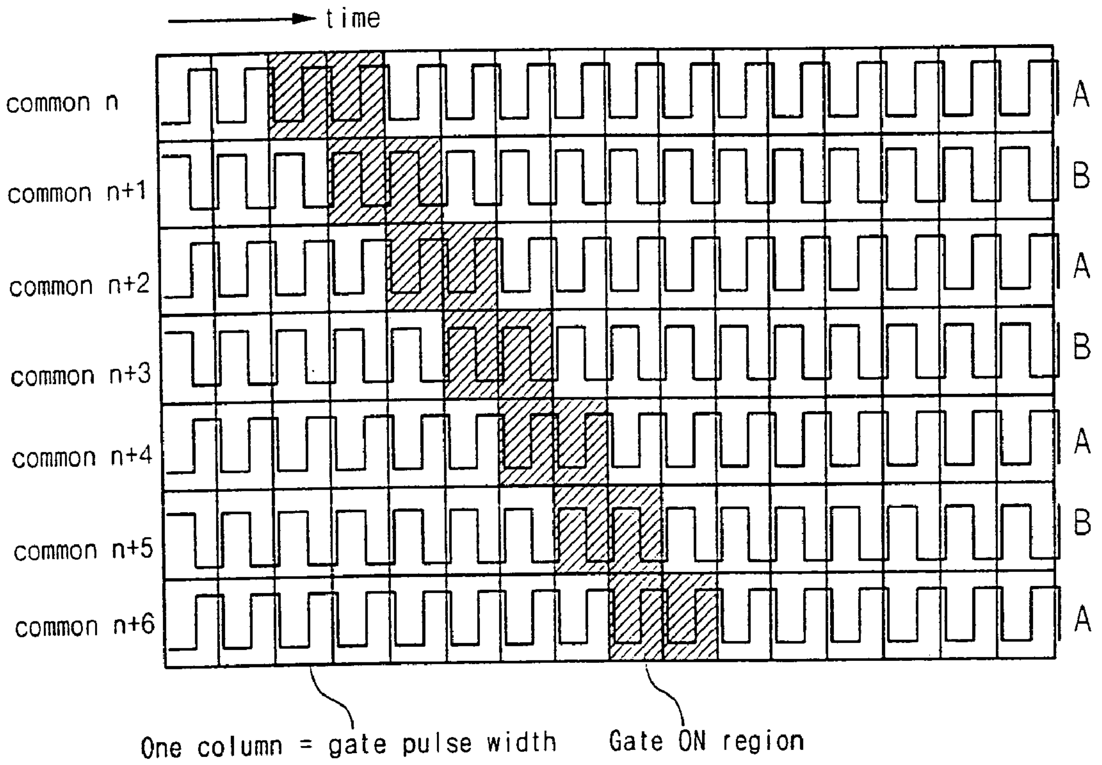
FIG. 16 is a waveform chart illustrating two types of storage voltage signals applied to the storage electrode lines shown in FIG. 15.

FIG. 16 is a waveform chart illustrating two types of storage voltage signals applied to the storage electrode lines shown in FIG. 15.

As shown in FIG. 16, the vertical axis indicates the storage electrode lines, and time passes by in the horizontal direction. One column in the horizontal direction has the same width as that of the gate pulse. The gate opens at the deviant lined region covering two columns at each row. The deviant lined two columns at each row are present because each pixel connected to the storage electrode ranges over the two upper and lower lines centering the storage electrode. That is, one storage electrode ranges over a half of the upper line and a half of the lower line.

The (n)th, (n+2)th, (n+4)th, and (n+6)th storage electrode lines are terminated with plus (+) while covering the pixels where plus (+) is inverted into minus (−). In contrast, the (n+1)th, (n+3)th, (n+5)th storage electrode lines cover the pixels where minus (−) is inverted into plus (+).

The (n)th, (n+2)th, (n+4)th, and (n+6)th storage electrode lines bear the same signals, and the (n+1)th, (n+3)th, (n+5)th storage electrode lines bear the same signals.

Therefore, in the above driving technique, signals are applied to the odd-numbered lines and the even-numbered lines while being inverted from each other.

Figure 17:
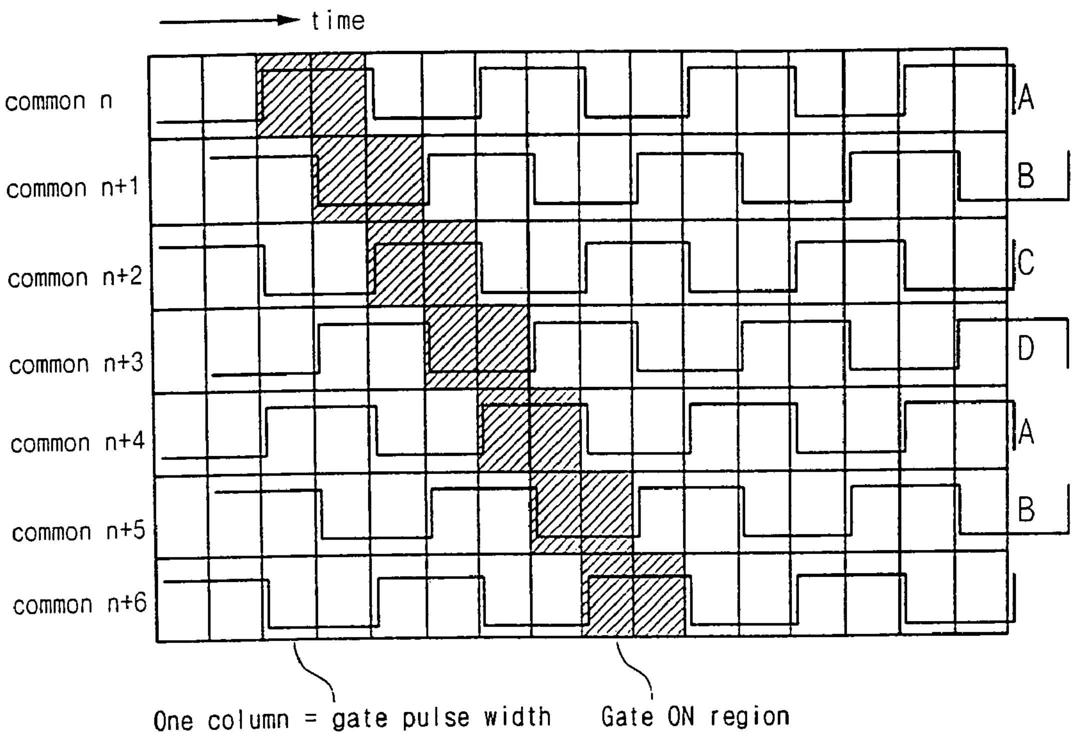
FIG. 17 is a waveform chart illustrating four types of storage voltage signals applied to the storage electrode lines shown in FIG. 15.

FIG. 17 illustrates four types of storage voltage signals applied to the storage electrode lines shown in FIG. 15.

As shown in FIG. 17, the frequency of the storage electrode line is a half of that of the data line. When one frame passes by, the signals of A and C are inverted from each other, and those of B and D are inverted from each other.

In the above driving technique, the driving can be made with a number of signals.

Figure 18:
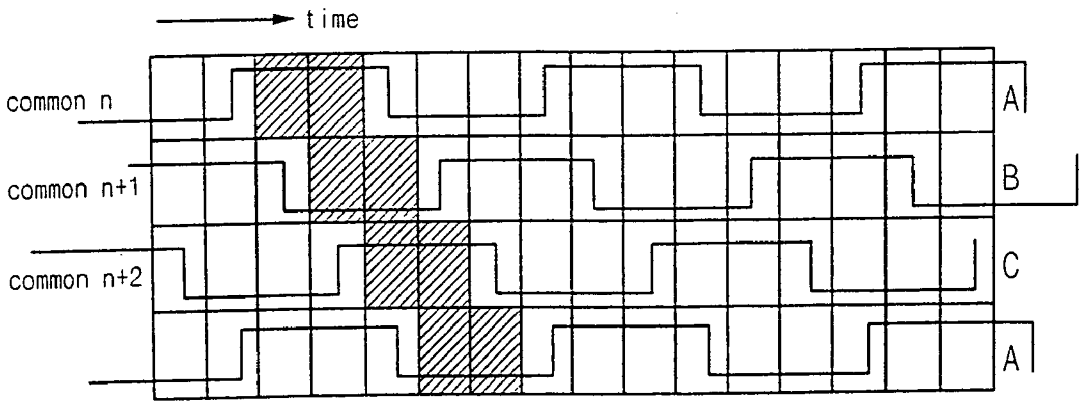
FIG. 18 is a waveform chart illustrating three types of storage voltage signals applied to the storage electrode lines shown in FIG. 15.
Figure 19:
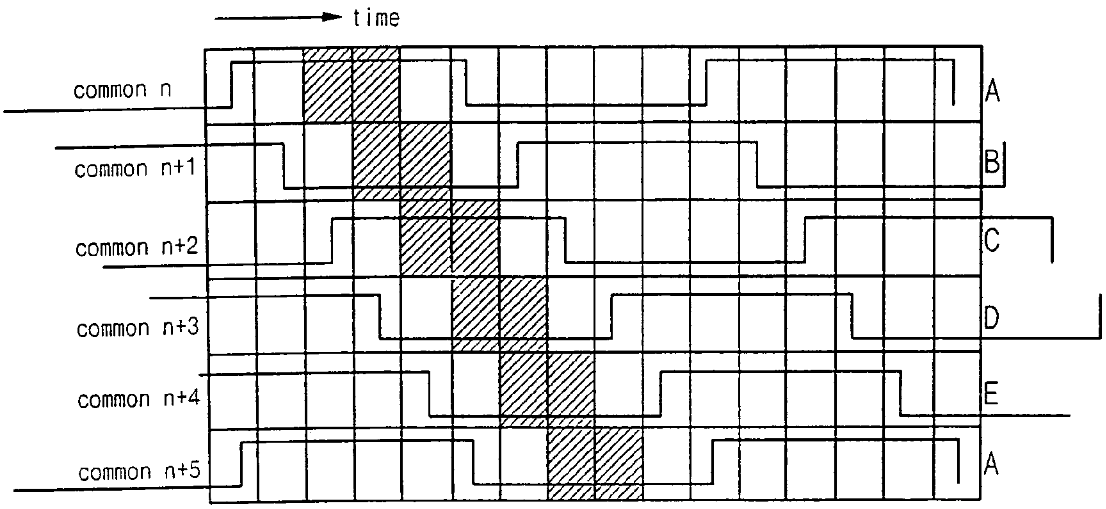
FIG. 19 is a waveform chart illustrating five types of storage voltage signals applied to the storage electrode lines shown in FIG. 15.
Figure 20:
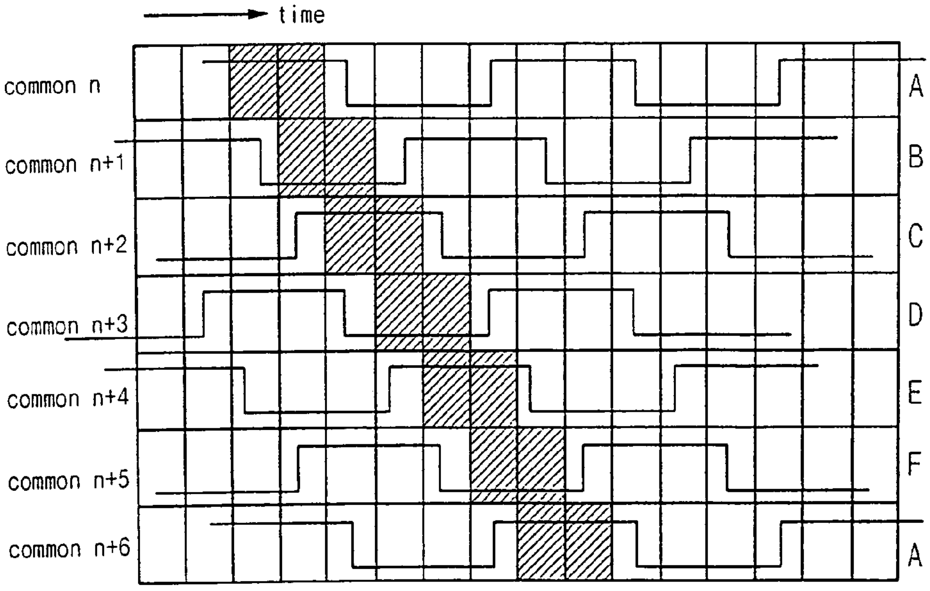
FIG. 20 is a waveform chart illustrating six types of storage voltage signals applied to the storage electrode lines shown in FIG. 14.

FIG. 18 is a waveform chart illustrating three types of storage voltage signals applied to the storage electrode lines shown in FIG. 15. FIG. 19 is a waveform chart illustrating five types of storage voltage signals applied to the storage electrode lines shown in FIG. 15, and FIG. 20 is a waveform chart illustrating six types of storage voltage signals applied to the storage electrode lines shown in FIG. 15.

As shown in the drawings, the odd-numbered signals have a wavelength longer than those of others.

Figure 21:
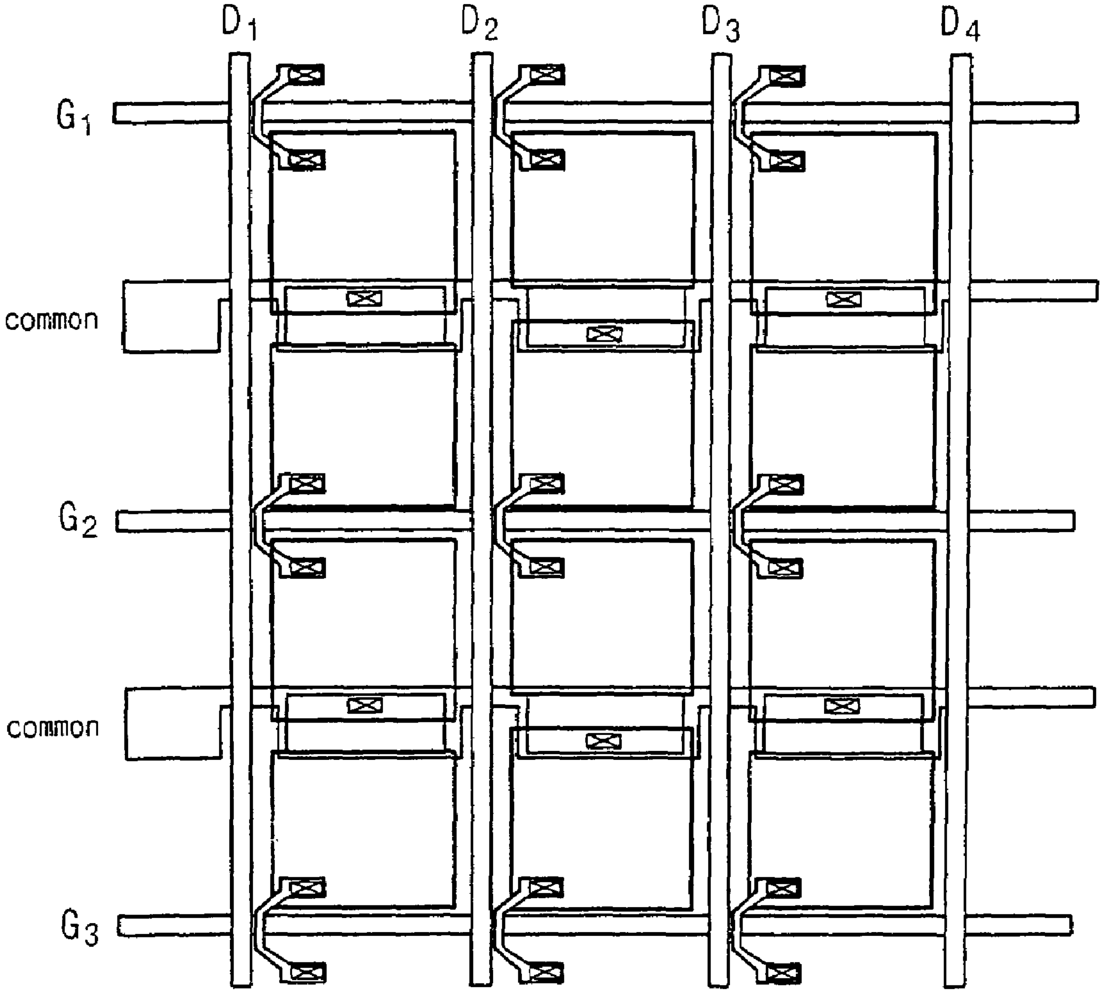
FIG. 21 illustrates a separation type pixel structure for the dot inversion driving in the LCD shown in FIG. 6.

FIG. 21 illustrates a separation type pixel structure for the dot inversion driving in the LCD shown in FIG. 6.

As shown in FIG. 21, storage electrode lines are arranged in the horizontal direction interposed between neighboring gate lines.

First pixels are formed at the regions surrounded by the odd-numbered gate lines and the even-numbered gate lines as well as odd-numbered data lines and even-numbered data lines. One end of each pixel is connected to the corresponding odd-numbered gate line, and the opposite end thereof connected to the corresponding storage electrode line.

Second pixels are formed at the regions surrounded by the odd-numbered gate lines and the even-numbered gate lines as well as the odd-numbered data lines and the even-numbered data lines. One end of each pixel is connected to the corresponding even-numbered gate line.

Third pixels are formed at the regions surrounded by the odd-numbered gate lines and the even-numbered gate lines as well as the even-numbered data lines and the odd-numbered data lines. One end of each pixel is connected to the corresponding odd-numbered gate line.

Finally, fourth pixels are formed at the regions surrounded by the odd-numbered gate lines and the even-numbered gate lines as well as the even-numbered data lines and the odd-numbered data lines. One end of each pixel is connected to the corresponding storage electrode line, and the opposite end connected to the corresponding even-numbered gate line.

In short, in order to drive the LCD based on the dot inversion driving, pixels are partitioned centering around the gate lines. Since the gate lines are spaced apart from the storage electrode lines with a predetermined distance, device failure due to line shorts can be prevented. The various techniques described with reference to FIGS. 16 to 20 can be also applied for the driving.

As described above, separate storage electrode lines for storage capacitors are periodically swung in synchronization with gate pulses to thereby generate overshoot. Consequently, when the gray scales are altered due to the memory effect of the liquid crystal capacitor, the response speed of the liquid crystal can be enhanced with the overshoot.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display (LCD), comprising:

a plurality of gate lines extending in a row direction and transmitting scanning signals;

a plurality of data lines extending in a column direction and transmitting picture signals;

a plurality of storage electrode line pairs extending in the row direction, each storage electrode line pair comprising first and second storage electrode lines arranged between two neighboring gate lines;

a plurality of first and second pixels arranged alternately in the row direction, each of the first and second pixels including a pixel electrode overlapping the storage electrode line pair, wherein a storage capacitance is formed between the pixel electrode and the storage electrode line corresponding thereto; and a plurality of switching elements provided corresponding to the first and second pixels, respectively, each switching element connected to the corresponding gate line and data line, wherein the storage capacitance of the first pixel is formed between the pixel electrode and the first storage electrode line corresponding thereto, and the storage capacitance of the second pixel is formed between the pixel electrode and the second storage electrode line corresponding thereto.

2. The LCD of claim 1, wherein the first and second storage electrode lines transmit first and second storage voltages, respectively, during a polarity of the picture signals is changed from negative to positive, the first and second storage voltages maintain a low level when the switching elements is turned off and repeatedly swing between the low level and a high level thereafter, and during a polarity of the picture signals is changed from positive to negative, the first and second storage voltages maintain the high level when the switching element is turned off and repeatedly swing between the low level to the high level thereafter.

3. The LCD of claim 2, wherein the first and second storage voltages have inverted waveforms.

4. The LCD of claim 3, wherein the first storage voltage applied to each first storage electrode line is generated by inverting the first storage voltage applied to one of the first storage electrode lines adjacent thereto and shifting the inverted first storage voltage by a pulse width of the scanning signals, and the second storage voltage applied to each second storage electrode line is generated by inverting the second storage voltage applied to one of the second storage electrode line adjacent thereto and shifting the inverted second storage voltage by a pulse width of the scanning signals.

5. A liquid crystal display (LCD), comprising:

a plurality of gate lines extending in a row direction and transmitting scanning signals;

a plurality of data lines extending in a column direction and transmitting picture signals;

a plurality of storage electrode lines extending in the column direction and transmitting storage voltages, the storage electrode lines and the data lines being alternately arranged; and a plurality of pixels, each of the pixels including a pixel electrode, each storage electrode line intersecting the pixel electrodes corresponding thereto, wherein a storage capacitance of each pixel is formed between the pixel electrode and the storage electrode line corresponding thereto.

6. The LCD of claim 5, wherein during a polarity of the picture signals is changed from negative to positive, the storage voltages maintain a low level when the switching elements is turned off and repeatedly swing between the low level and a high level thereafter, and during a polarity of the picture signals is changed from positive to negative, the storage voltages maintain a high level during the switching element is turned off and swing between the low level and the high level thereafter.

7. The LCD of claim 5, wherein the storage voltages applied to the neighboring storage electrode lines have inverted wave form.

8. A liquid crystal display (LCD), comprising:

a plurality of gate lines extending in a first direction and transmitting scanning signals;

a plurality of data lines extending in a second direction and transmitting picture signals;

a plurality of storage electrode lines extending in the first direction and transmitting storage voltages, the storage electrode lines and the gate lines being alternately arranged; and a plurality of pixels arranged in a matrix, each of the pixels including a first pixel electrode overlapping the storage electrode line corresponding thereto; and a plurality of switching elements provided corresponding to the pixels, respectively, each switching element connected to the corresponding gate line and data line, wherein storage capacitances of the pixels on the same row are alternately formed between the first pixel electrodes and two neighboring storage electrodes lines.

9. The LCD of claim 8, wherein during a polarity of the picture signals is changed from negative to positive, the storage voltage maintain a low level when the switching elements is turned off and repeatedly swings between the low level and a high level thereafter, and during a polarity of the picture signals is changed from positive to negative, the storage voltage maintain the high level when the switching element is turned off and repeatedly swings between the low level and the high level thereafter.

10. The LCD of claim 8, wherein the storage voltage applied to each storage electrode line is generated by inverting the storage voltage applied to one of the storage electrode line adjacent thereto and shifting the inverted storage voltage by a pulse width of the scanning signals.

11. The LCD of claim 8, wherein each pixel electrode further includes a second pixel electrode, and the gate line is arranged between the first pixel electrode and the second pixel electrode in each pixel.

* * * * *